United States Patent
Vinson et al.

(10) Patent No.: US 8,117,012 B2
(45) Date of Patent: Feb. 14, 2012

(54) METHOD FOR DETERMINING COOLING REQUIREMENTS OF A COMPUTER SYSTEM ENCLOSURE

(75) Inventors: Wade D. Vinson, Houston, TX (US);
Paul R. Culley, Houston, TX (US);
Thomas D. Rhodes, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 682 days.

(21) Appl. No.: 12/213,146

(22) Filed: Jun. 16, 2008

(65) Prior Publication Data

US 2008/0312888 A1 Dec. 18, 2008

Related U.S. Application Data

(60) Provisional application No. 60/943,971, filed on Jun. 14, 2007.

(51) Int. Cl.
*G06F 17/50* (2006.01)

(52) U.S. Cl. ............................................ 703/1; 702/130

(58) Field of Classification Search .................. 703/2, 1; 361/965; 702/130
See application file for complete search history.

(56) References Cited

U.S. PATENT DOCUMENTS

| | | | | |
|---|---|---|---|---|
| 5,168,424 A | * | 12/1992 | Bolton et al. | ................ 361/695 |
| 5,727,928 A | * | 3/1998 | Brown | ........................ 417/44.11 |
| 6,778,386 B2 | * | 8/2004 | Garnett et al. | ........... 361/679.48 |
| 6,925,828 B1 | * | 8/2005 | Gerstner et al. | ............. 62/259.2 |

* cited by examiner

*Primary Examiner* — Dwin M Craig

(57) ABSTRACT

A computer-implemented method is used for determining cooling requirements of a computer system enclosure, where the enclosure includes a number of installed modules, the modules including fan modules. The method includes the steps of determining an individual impedance curve of each installed module; determining fan curves for the installed fan modules; based on the individual impedance curves, determining an overall system impedance curve for the computer system; determining desired performance requirements for the computer system; based on the desired performance requirements, determining corresponding fan curves; and choosing a fan curve that intersects the system impedance curve.

20 Claims, 4 Drawing Sheets

METHOD FOR DETERMINING COOLING REQUIREMENTS OF A COMPUTER SYSTEM ENCLOSURE

CROSS REFERENCE TO RELATED APPLICATIONS

This application claims priority from U.S. Provisional Application 60/943,971 filed Jun. 14, 2007 entitled "METHOD OF COOLING A BLADE ENCLOSURE", the content of which is incorporated herein in its entirety to the extent that it is consistent with this invention and application.

BACKGROUND

Computer system components, such as central processing units (CPUs), chipsets, graphics cards, and hard drives, produce large amounts of heat during operation. This heat must be dissipated in order to keep these components within safe operating temperatures. Overheated components generally exhibit a shorter life span and may also cause malfunction of the computer system.

The risk of overheating increases with increasing density of computer system components. In a typical blade server, a large number of heat generating blades may be closely placed in a single system enclosure. Limited open space in the system enclosure results in reduced air circulation and correspondingly reduced heat dissipation.

Because of these heat loads, many blade server enclosures include a thermal management system that uses both active (i.e., convection) and passive (e.g., heat sinks) cooling. Convection cooling generally relies on one or more fans that operate at either fixed or variable speeds. A variable speed fan generally is best for matching air flow to heat load. However, the setting of this variable fan speed presents a design problem. Ideally, the cooling fans would operate at a speed that does not waste energy while maintaining the blades at the optimum operating temperature. More specifically, the blades may be cooled simply by operating the fans at a constant high speed. This approach causes a waste of energy when the blades are not operating at their maximum capacity. One approach is to use temperature-sensing devices in the fans, where the temperature-sensing devices directly measure how much heat the server generates in the exhaust air stream. When the fan detects that the server exhaust temperatures are increasing, the fan's microcontroller can increase fan speed. However, this approach has its limitations because servers can heat up very quickly, and the server's ROM could trip on a thermal shutdown before the fans could create enough additional cooling. thus, in designing and configuring a specific computing system, such as a blade server, the operating and physical characteristics of the individual modules that could be installed in the system enclosure should be considered and used to provide as near optimum a cooling system configuration as possible.

SUMMARY

Disclosed herein is a computer-implemented method for determining cooling requirements of a computer system enclosure, where the enclosure includes a plurality of installed modules, the modules including fan modules. The method includes the steps of: determining an individual impedance curve of each installed module; determining fan curves for the installed fan modules; based on the individual impedance curves, determining an overall system impedance curve for the computer system; determining desired performance requirements for the computer system; based on the desired performance requirements, determining corresponding fan curves; and choosing a fan curve that intersects system impedance curve.

DESCRIPTION OF THE DRAWINGS

The detailed description will refer to the following drawings, in which like numerals refer to like elements, and in which.

DETAILED DESCRIPTION

Figure 1A:
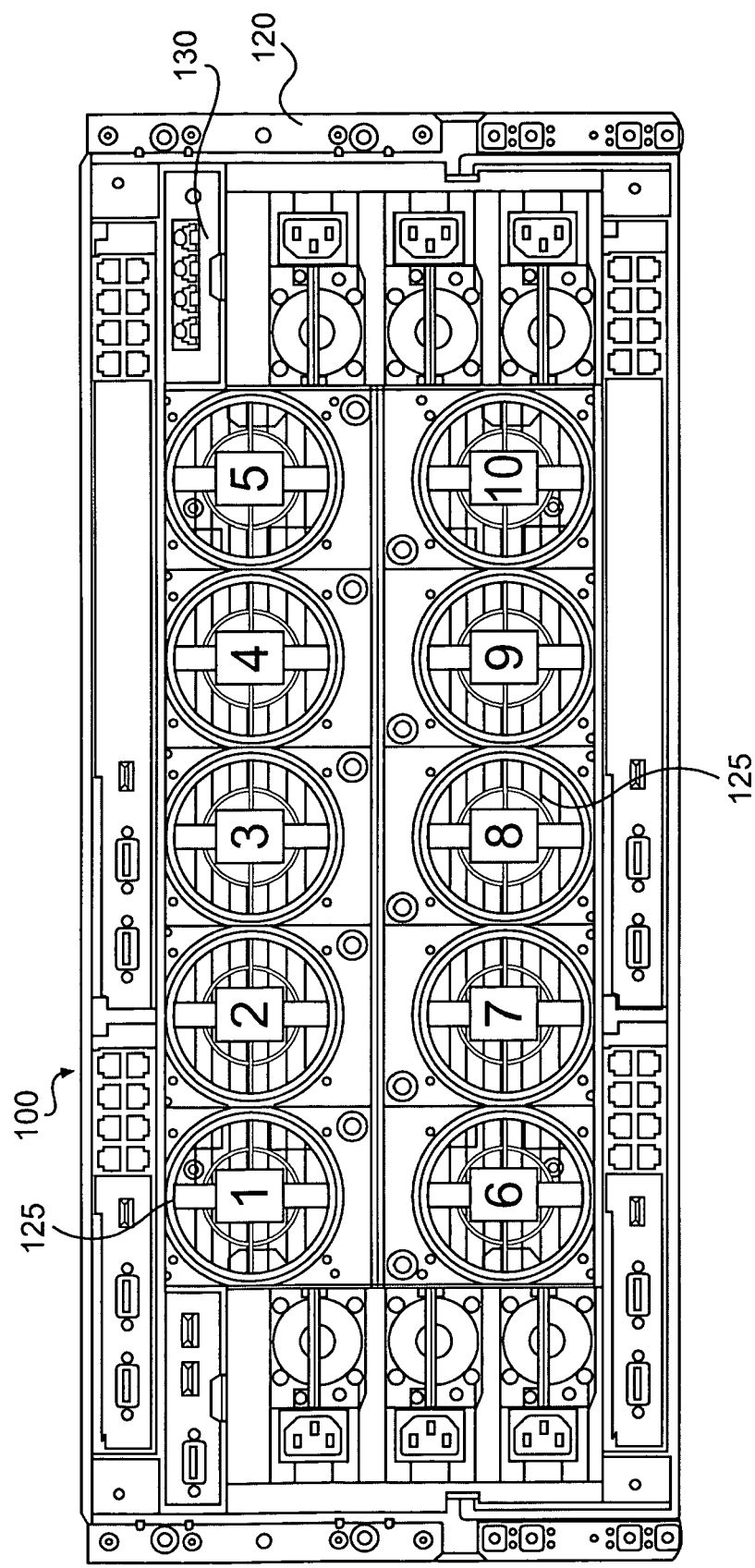
FIGS. 1A and 1B illustrate an exemplary blade server.

Disclosed herein are methods for determining cooling requirements of a computer system. The methods apply to computer systems that include one or more modules, installed in an enclosure, with the modules generating heat as a result of operation. The methods rely on the use of one or more air movers installed within, or adjacent to, the computer system enclosure. In an embodiment, the computer system is a blade server, the modules are blades (server and storage), I/O modules, and on-board administrator modules, and the air movers are fans. The disclosed methods allow designers to develop as near optimum a cooling system configuration as possible.

Blade enclosures, in particular, pose a unique thermal challenge as system designers strive to make such enclosures more compact and powerful, in essence, packing more and more computing power into smaller and smaller volumes. Each such increase in computing system density comes with a cost of increased demand for heat dissipation. Added to this dilemma is the reconfigurable nature of blade systems. More specifically, some blade enclosures may only be partly populated with heat-generating modules, while others are fully populated. In addition, individual blades themselves may produce differing amounts of heat, and such heat production may be based on design (number of processors installed, for example) and actual use (percent utilization). Some blades may have different sized hard drives, multiple processors, and different memory configurations, for example, all of which result in different thermal characteristics for the blade server as a whole. Furthermore, different versions of the same module may affect the thermal characteristics of the blade server. For example, a model A processor may operate most efficiently at X° C. while the model B processor operates most efficiently at (X−5)° C. Note that efficiency may have several measures, including transactions per minute (TPM) and mean time between failures (MTBF), for example.

Solutions to these problems are similarly diverse and depend to some degree on individual customer needs. For example, some customer may be willing to sacrifice noise levels (which increase with increasing air flow) for the increased reliability that generally follows such increased air flow. Other customers want minimal costs, and so would want a computing system with fewer air movers, even if that arrangement meant lower reliability, and many of these customers would prefer simply to reduce total fan power used to cool the blade server.

The thermal needs of each module in the blade enclosure, as well as the overall blade enclosure, can be defined by a thermal curve that shows the specific cooling requirements of the module versus performance (i.e., workload) of the module. This thermal curve may be adjusted based on environmental factors such as ambient room temperature and position of the module within the enclosure. For example, a blade installed in an enclosure between two other blades may be in a more adverse thermal environment than a single blade installed in the same enclosure. The thermal curves are actual airflow impedance curves. That is, the thermal curves show the relationship between air flow and resistance to airflow (differential pressure) based on actual design and configuration of a blade enclosure. The actual airflow need (thermal need) is based on module performance, and exists as a point on the impedance curve.

Once the thermal curves of each module are determined, the server's cooling needs can be determined accurately for existing operations, and can be predicted for anticipated future operations. In a blade enclosure, these cooling needs may be met in a number of different ways.

One such way to meet the enclosure's cooling needs is to operate multiple fans in unison. How may fans to operate, and the speed at which to operate these fans is best determined by first determining the thermal characteristics of the fans. By using variable speed fans, different amounts of cooling air, generally expressed in cubic feet per minute (CFM) may be move through the enclosure. For example, the overall cooling needs of the modules in a blade enclosure call for V CFM. One fan operating at its maximum speed R may be able to supply the required V CFM. However, two fans operating at ½ R may or may not be able to supply the required V CFM. Furthermore, power requirements and noise levels associated with fan operation also may not scale linearly. For example, a fan running at ½ R may use less than ½ the power of the same fan running at full speed R. The fans available for cooling blade enclosures are capable of very precise speed control, from 0 RPM to over 17,000 RPM.

FIG. 1A illustrates (in a rear-end view) an exemplary server 100 having ten fans 125 and on-board administrator module 130, all installed within enclosure 120. Other components installed in the enclosure 120 enable connection and operation of the server 100.

Figure 1B:
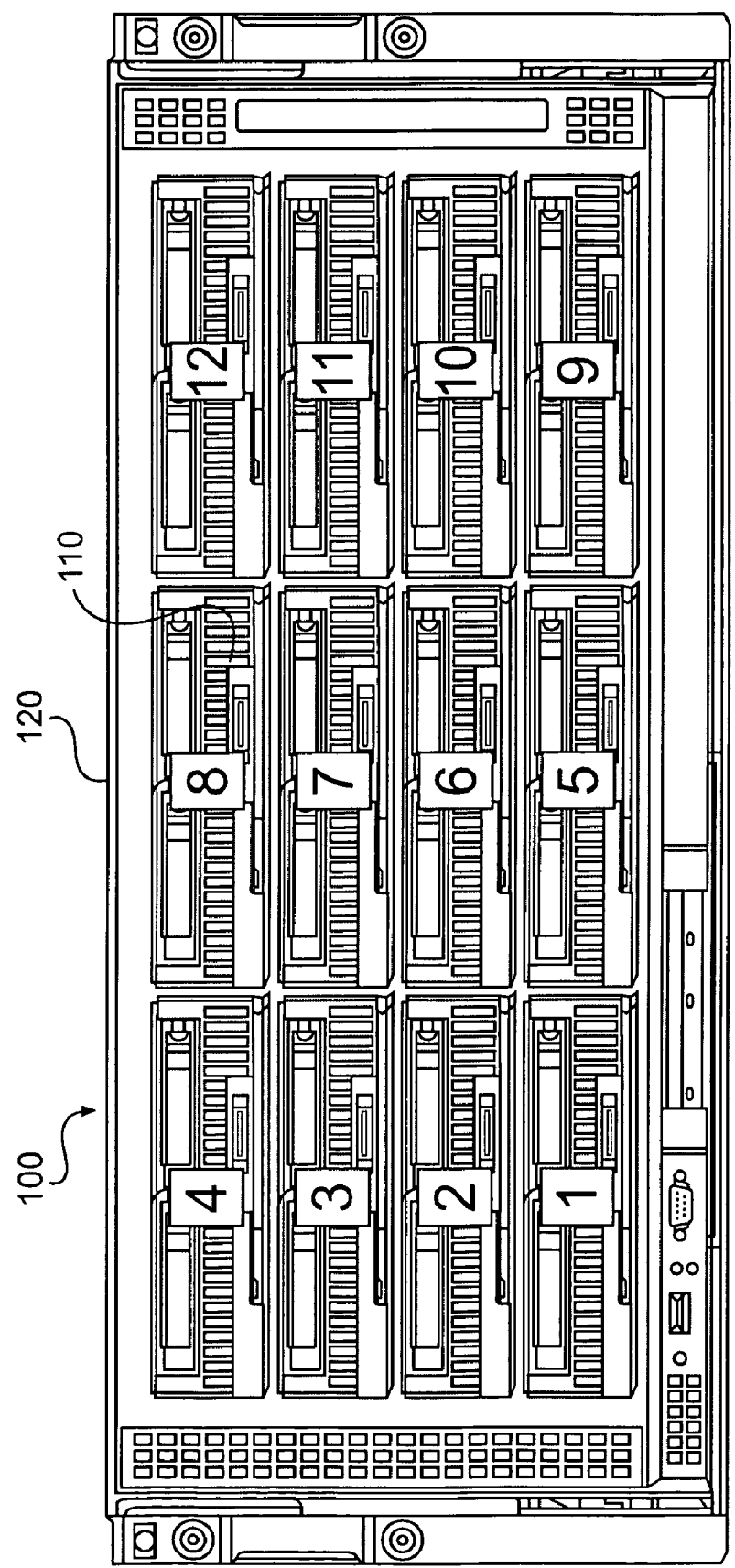

FIG. 1B illustrates a front view of the server 100 showing installed server blades 110. The fans 125 pull air over the blades 125 and exhaust the heated air at the rear of the enclosure 120.

In an embodiment, the cooling fans 125 are pulse-width modulation (PWM) fans. PWM fans are well known to those skilled in the art. The speed of a PWM fan is controlled by a PWM control signal. The fan speed response to the PWM control signal is a continuous and monotonic function of the duty cycle of the signal, from 100 percent to the minimum specified revolutions per minute (RPM).

As used herein, the term "PWM fan" or "fan" refers not only to fans attached to a computer chassis, but may also be intended to signify any other computer fans, such as CPU fans, graphics processing unit (GPU) fans, chipset fans, power supply unit (PSU) fans, hard disk drive (HDD) fans, or peripheral component interconnect (PCI) slot fans. PWM fans can be of various sizes and power. Common computer fans have sizes range between 40 mm to 120 mm in diameter.

Although FIG. 1A shows the server 100 with ten fans 125, the server 100 is not so limited, and may employ more or fewer fans, depending on the server's cooling requirements, cost, and certain performance characteristics. For example, the server 100 may be configured with four, six, eight, or ten fans. The number of such fans installed in the server 100 also directly affects the efficiency of the fans in cooling the blades.

That is, ten fans can cool a group of blades by running at lower RPMs that six or eight fans would run at to cool those same blades.

The fans 125 shown in FIG. 1A can operate at varying RPMs. The selection of a RPM at which to operate the fans 125 may be determined by the system designer. Again, the RPM setpoint may be determined based on a variety of factors. In an embodiment, selection of the RPM setpoint is based on the overall heat load of the server 100 and the cooling capacity of the installed fans 125.

Since the enclosure 120 may contain, for example, 10 fan modules and 16 other modules, determination of the specific fan speed needed to cool the enclosure 120, and then setting each fan to that speed is complicated. More specifically, each type of blade 110 may have its own unique cooling requirements. A noted above, these cooling requirements depend on various factors including the number of processors on the blade, the amount of installed memory, the number of installed hard drives, and blade utilization. In a simplification, the fans 125 may all be set to the same RPM. Alternatively, the modules in the enclosure 120 may be grouped into zones, and the fan speed for the fans 125 in each zone may be determined based on the heat load of that particular zone.

The exemplary server 100 shown in FIGS. 1A and 1B has installed 26 modules (10 fan modules, or simply fans 125, 12 server blades 110, and 4 other modules). By determining the characteristic curves of the fans 125 in the enclosure 120, and then applying those curves to the range of operating conditions for the server 100, multiple means (e.g., combinations of fans operating and fan RPM) are available for achieving the desired cooling. Furthermore, the optimum means for achieving the desired cooling can be based on specific customer requirements. For example, if the customer requires quiet operation, the optimum cooling means would involve more fans running at lower speeds. If the customer requires the lowest possible initial cost, the optimum means would involve running fewer fans at higher speeds.

Each of the 26 modules within the enclosure 120 may have multiple, specific thermal "need" levels based on operating characteristics of the module. The thermal need levels refer in part to the amount of heat that must be dissipated during the module's operation. These multiple thermal need levels complicate the cooling design problem. For example, if ten of the modules each have four thermal need levels there are 10,000 possible thermal need scenarios just for these ten modules. The remaining 16 modules may capable of a much finer level of monitoring, and, in an embodiment, can report 256 possible thermal need levels. Finally, the 26 modules can be present in many possible combinations (although some combinations are unlikely). The fans, as noted above, can operate between 0 and over 17,000 RPM, which translate directly into specific air flow values (CFM) through the enclosure 120. The effect of these possibilities of thermal needs and thermal responses is literally billions of possible thermal need values, and thermal responses, to compute for the server 100, as a whole.

To simplify implementation of an optimum thermal balance (needs versus responses) for the enclosure 120, the levels of thermal needs may be grouped into regions, and the thermal responses may be limited to those where all fans 125 in the enclosure 120 operate at the same RPM. Alternately, the thermal balance may be addressed based on zones, as noted above. While grouping needs and responses may not be ideal, such a method of addressing the thermal balance of the enclosure 120 still produces very favorable thermal results.

The table that follows illustrates one possible thermal grouping method, and specifically shows thermal grouping for two fans or four fans to cool four server blades.

| Two fans cooling four server blades | | Four fans cooling four server blades | |
|---|---|---|---|
| Thermal need 0-255 | Fan speed | Thermal need 0-255 | Fan speed |
| 48 | 5000 | 48 | 5000 |
| 56 | 5420 | 56 | 5320 |
| 64 | 5840 | 64 | 5640 |
| 72 | 6260 | 72 | 5690 |
| 80 | 6680 | 80 | 6280 |
| 88 | 7100 | 88 | 6600 |
| 96 | 7520 | 96 | 6920 |
| 104 | 7940 | 104 | 7240 |
| 112 | 8360 | 112 | 7560 |
| 120 | 8780 | 120 | 7880 |
| 128 | 9200 | 128 | 8200 |
| 136 | 9620 | 136 | 8520 |
| 144 | 10040 | 144 | 8840 |
| 152 | 10460 | 152 | 9160 |
| 160 | 10880 | 160 | 9480 |
| 168 | 11300 | 168 | 9800 |
| 176 | 11720 | 176 | 10120 |
| 184 | 12140 | 184 | 10440 |
| 192 | 12560 | 192 | 10760 |
| 200 | 12980 | 200 | 11080 |
| 208 | 13400 | 208 | 11400 |
| 216 | 13820 | 216 | 11720 |
| 224 | 14240 | 224 | 12040 |
| 232 | 14660 | 232 | 12360 |
| 240 | 15080 | 240 | 12680 |
| 248 | 17300 | 248 | 15999 |

Figure 2:
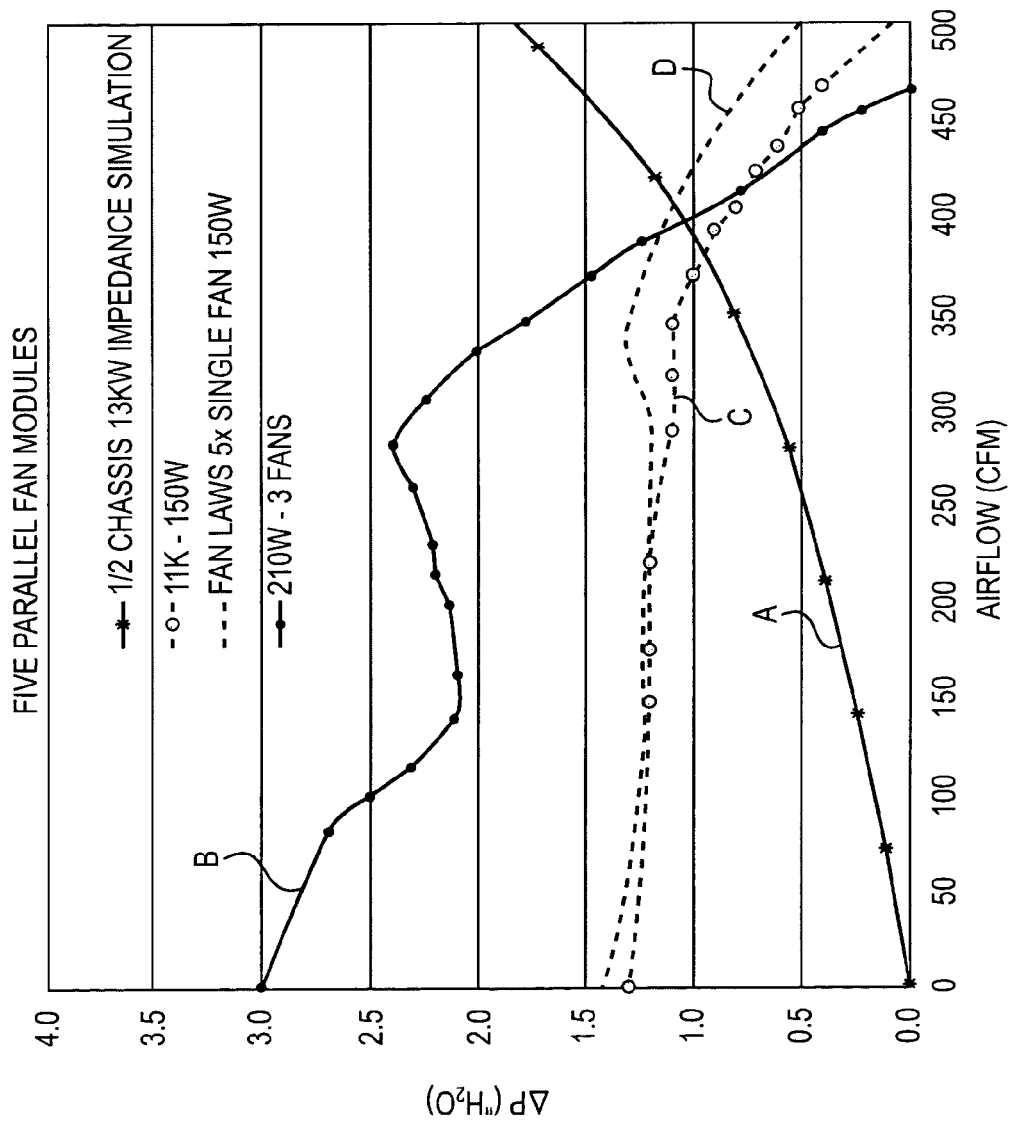
FIG. 2 illustrates airflow versus airflow resistance for the exemplary blade server.

To take into account all the variants, a thermal balance program may be used to determine possible thermal responses to thermal needs. The thermal responses may be displayed as actual fan curves, while the thermal needs may be displayed as impedance curves for individual modules within the system enclosure, as well as for the entire system. FIG. 2 illustrates airflow versus airflow resistance for the server 100. That is, FIG. 2 slows the results of a thermal balance calculation performed using the thermal balance program. In FIG. 2, the Y-axis represents differential pressure, or resistance to flow, and the X-axis represents air flow in CFM. Thus, a fan operating at a high differential pressure will produce a low air flow similarly, a module (or group of modules) that produce a high differential pressure, or resistance to flow (impedance) will experience a low air flow. To construct the curves shown in FIG. 2, individual modules were tested for resistance to flow. Next, the total impedance was calculated for groups of these modules, thereby defining the system impedance curve (curve A). One method for defining the system impedance curve is to simply total the individual impedance curves. Curve A is based on a simulation in which the enclosure 120 is populated with half its full complement of modules (i.e., five fan modules and eight server blades—a ½ chassis 13 kW impedance simulation). Design heat load requirements of these modules is a known quantity, so that a specific point on curve A (in CFM) can be determined as the optimum air flow to cool the blade enclosure 120. In the exemplary server 100, that air flow is approximately 400 CFM.

Since multiple fan configurations, and multiple fan operating speeds can satisfy the thermal need (impedance) represented by the 400 CFM point on curve A, the thermal balance program includes algorithms to produce thermal response curves that relate fan RPM to differential pressure for air flow through the enclosure 120. FIG. 2 shows two such curves (B and C) and a theoretical thermal response curve (curve D), which is based on fan laws. Curve B illustrates the affect of operating 3 fans at a high RPM, in excess of 17,000 RPM. As noted on FIG. 2, this combination of fan and fan speed requires about 210 watts of power. The same cooling airflow can be produced by operating more fans at lower speed. Curve C shows five fans operating at 11,000 RPM. Finally, using theoretical fan curves, where the affect of a single fan is adjusted to account for five fans operating at the same RPM, curve D shows that the fan laws can be used to determine cooling requirements. That is, curve D (theoretical) predicts performance that matches very closely the empirical data represented by curve C.

Figure 3:
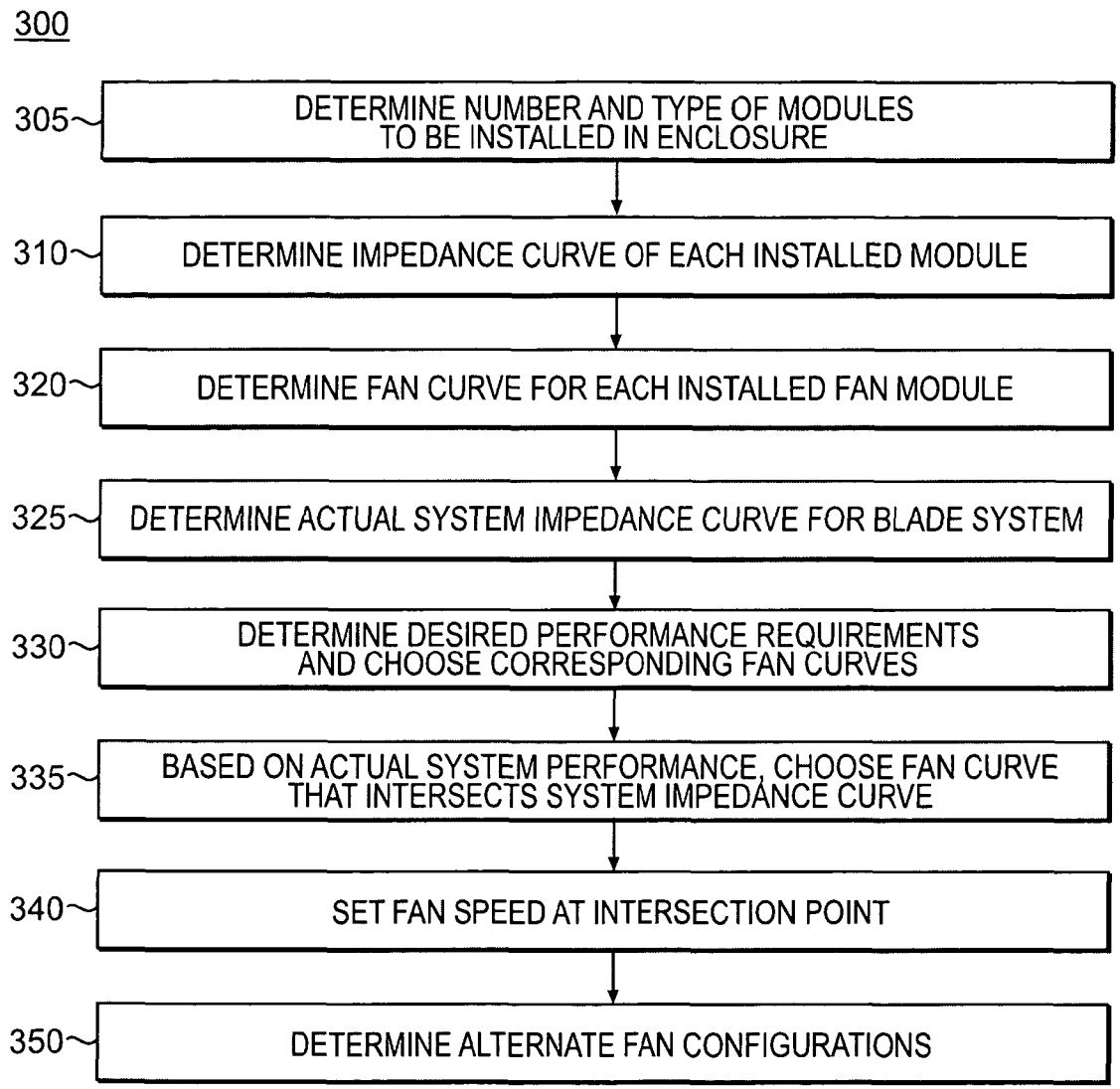
FIG. 3 is a flowchart illustrating an exemplary method for determining cooling requirements of the blade server of FIGS. 1A and 1B.

FIG. 3 is a flowchart illustrating an exemplary, computer-implemented method 300 for optimizing thermal balance in a computer system such as the server 100 of FIG. 1A. The method 300 begins, block 305, when the server's configuration is stated, including number and types (ratings) of fans, number and types of blades and number and types of other modules. In block 310 the thermal balance program is used to determine/read impedance curves of each installed module in the enclosure 120. Next, in block 320, the fan curve of each installed fan is determined/read.

With the individual module impedance curves determined, in block 325, the thermal balance program is used to determine an actual overall impedance curve for blade system by combining the individual impedance curves of each module to arrive at the overall system impedance curve. In block 330, the thermal balance program receives as inputs desired performance requirements (e.g., required airflow to cool the system modules) and then is used to determine corresponding fan curves. In block 335, and based on projected actual system performance, the thermal balance program is used to choose a fan curve that intersects the system impedance curve. In block 340, the fan speed is set at the intersection point of the fan curve and the system impedance curve. Finally, in block 350, the results are compared to the customer's requirements for noise, power, or number optimization and any alternate configurations that meet the requirements of blocks 330-340 also are determined.

The various disclosed embodiments may be implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, DC-ROM, ROM, etc. The code is distributed on such media, or is distributed to users from the memory or storage of one computer system over a network of some type to other computer systems for use by users of such other systems. Alternatively, the programming code is embodied in the memory (such as memory of a handheld portable electronic device) and accessed by a processor using a bus. The techniques and methods for embodying software programming code in memory, on physical media, and/or distributing software code via networks are well known and will not be further discussed herein.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A computer-implemented method for determining cooling requirements of a computer system enclosure, the enclosure comprising a plurality of installed modules, the modules including fan modules and other modules, the method, comprising:
    determining an individual impedance curve of each installed module;
    determining fan curves for the installed fan modules;
    based on the individual impedance curves, determining an overall system impedance curve for the computer system;
    determining desired performance requirements for the computer system enclosure;
    based on the desired performance requirements, selecting corresponding fan curves; and
    choosing a fan curve from the corresponding fan curves that intersects the system impedance curve.

2. The method of claim 1, wherein the computer system is a server and the modules include blades.

3. The method of claim 2, wherein the fans are pulse-width modulation (PWM) fans.

4. The method of claim 2, wherein the blades include server blades and storage blades.

5. The method of claim 2, further comprising setting fan speed at the intersection of the fan curve and the system impedance curve.

6. The method of claim 2, wherein the impedance curves are set based on groupings of thermal needs of the modules.

7. The method of claim 6, wherein the fan curves are determined based on the groupings of the thermal needs of the modules.

8. The method of claim 2, further comprising grouping the modules into zones and determining the cooling requirements of each zone.

9. The method of claim 2, wherein the computer system comprises multiple cooling fans running at the same RPM.

10. The method of claim 2, wherein the computer system comprises multiple cooling fans running at different RPMs.

11. A computer-implemented method for determining a thermal balance of a computer system enclosure, the enclosure including one or more server blades, one or more other modules, and one or more fans operating as air movers, the method comprising:
    determining an impedance curve of each installed blade, module, and fan, thereby determining a plurality of individual impedance curves;
    determining fan curves for the installed fans;
    determining an overall system impedance curve for the computer system based on the plurality of individual impedance curves;
    determining desired performance requirements for the computer system;
    based on the desired performance requirements, determining corresponding fan curves; and
    from the determined fan curves, choosing a fan curve that intersects the system impedance curve.

12. The method of claim 11, further comprising setting fan speed where the fan curve intersects the system impedance curve.

13. The method of claim 11, wherein the desired performance requirements include one or more of fan noise levels, power consumption, and cost.

14. The method of claim 13, further comprising determining alternate fan configurations, based on the desired performance requirements.

15. A computer readable non-transitory storage media comprising computer code for implementing a method for optimizing cooling requirements in a computer system enclosure, the enclosure including one or more blades, fans operating as air movers, and other modules, the method, comprising:
    determining an impedance curve of each installed blade, module, and fan, thereby determining a plurality of individual impedance curves;
    determining fan curves for the installed fans;
    determining an overall system impedance curve for the computer system based on the plurality of individual impedance curves;
    determining desired performance requirements for the computer system;
    based on the desired performance requirements, determining corresponding fan curves; and
    choosing a fan curve that intersects the system impedance curve.

16. The computer-readable non-transitory storage media of claim 15, the method further comprising setting fan speed where the fan curve intersects the system impedance curve.

17. The computer-readable non-transitory storage media of claim 15, wherein the desired performance requirements include one or more of fan noise levels, power consumption, and cost.

18. The computer-readable non-transitory storage media of claim 17, the method further comprising determining alternate fan configurations, based on the desired performance requirements.

19. The computer-readable non-transitory storage media of claim 15, wherein the overall system impedance curve consists of the impedance curves of each installed blade, module, and fan.

20. The computer-readable non-transitory storage media of claim 15, the method further comprising:
    grouping levels of thermal needs into regions; and
    grouping thermal responses into similar and corresponding regions.

* * * * *